United States Patent

Taniguchi et al.

[15] 3,689,159
[45] Sept. 5, 1972

[54] LASER PROCESSING APPARATUS

[72] Inventors: Ichiro Taniguchi, Itam; Shigeru Ando, Osaka, both of Japan

[73] Assignee: Mitsubishi Electric Corporation, Tokyo, Japan

[22] Filed: June 22, 1970

[21] Appl. No.: 48,208

[52] U.S. Cl. .............. 356/123, 219/121 L, 250/232
[51] Int. Cl. .............................................. B23k 9/00
[58] Field of Search..... 219/121 L; 356/123; 250/232

[56] References Cited

UNITED STATES PATENTS

| | | | |
|---|---|---|---|
| 3,506,839 | 4/1970 | Ando et al. | 250/222 |
| 3,369,101 | 2/1968 | Curcio | 219/121 LA |
| 3,456,651 | 7/1969 | Smart | 219/121 LA |
| 3,463,594 | 8/1969 | Myer | 350/81 |
| 3,383,491 | 5/1968 | Muncheryan | 350/81 |
| 3,392,258 | 7/1968 | Bruma et al. | 350/81 |

FOREIGN PATENTS OR APPLICATIONS 6,607,025  0/1966  Netherlands........... 219/121 L

*Primary Examiner*—Ronald L. Wibert
*Assistant Examiner*—Jeff Rothenberg
*Attorney*—Oblon, Fisher & Spivak

[57] ABSTRACT

A laser shaping apparatus for automatically shaping a workpiece with a laser and for providing automatic control so that the focal point of the laser light which is focused by a lens always corresponds with the point on the workpiece which is being shaped.

8 Claims, 7 Drawing Figures

FIG. 1
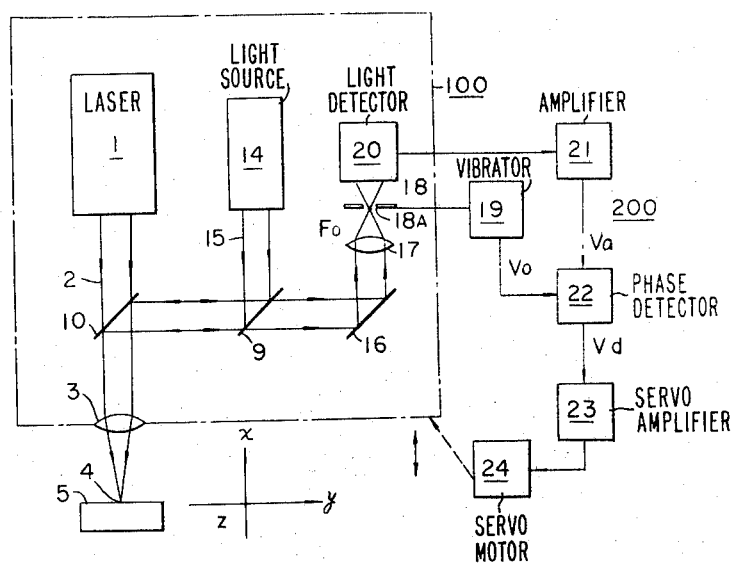
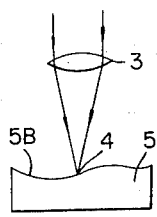
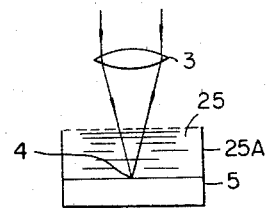
FIG. 2a    FIG. 2b
INVENTOR
ICHIRO TANIGUCHI
SHIGERU ANDO

INVENTOR
ICHIRO TANIGUCHI
SHIGERU ANDO

BY Oblon, Fisher & Spivak
ATTORNEY

LASER PROCESSING APPARATUS

BACKGROUND OF THE INVENTION

1. Field Of The Invention

This invention relates generally to a laser shaping apparatus and more particularly to a laser shaping apparatus for melting the point of shaping a workpiece by a laser light from a laser source such that recesses, grooves and the like or cutting of the workpiece may be provided.

2. Description Of The Prior Art

If a workpiece has the property of absorbing light when the same is focused by a suitable optical system on a point thereof to be shaped, then the light energy so absorbed with be converted to heat energy and accordingly increase the temperature at the point of shaping. If the light energy projected on the workpiece is increased, the temperature at the shaping point on the workpiece will be further increased and the material of the workpiece will be melted and vaporized so as to form a recess or hole. When the above procedure is used at numerous points on the workpiece, then forms, grooves, cutting of the workpiece or the like may be realized.

In the past, it has been suggested that a laser apparatus be used as a light source for projection on a workpiece. Such a laser light projected from the laser apparatus will have a high enough density and parallelism to enable an effective shaping of a workpiece to be performed. While projection of the laser light alone is somewhat satisfactory, it is still preferable to focus and concentrate the laser light onto the workpiece so as to provide a still higher density of light at the point of shaping of the workpiece. Now, if the point of shaping accurately coincides with the focal point of the laser light, the density of the light energy at the point of shaping will be at a maximum and the workpiece may be shaped with the greatest efficiency.

One of the problems in the past was with the difficulty in controlling the point of shaping so as to maintain the same coincident with the focal point of the laser light. Thus, in the past, one way of maintaining the point of shaping in coincidence with the focal point of the laser light was to make a visual analysis and in accordance therewith to manually make proper adjustments. Such a prior art technique is tedious and requires a long time to assure that the shaping point is coincident with the focal point of the laser light. The inconvenience of the prior art technique becomes readily apparent in the example of shaping a spherical surface. Thus, in the shaping of a spherical surface, a long time is required in that a confirmation must be made at each point of shaping as to whether the respective point of shaping on the workpiece is coincident with the focal point of the laser light. A need therefore existed for an apparatus which would automatically adjust and control so that the point of shaping is always maintained coincident with the focal point of the laser light.

The inventor herein has devised in U.S. Pat. No. 3,506,839, which is assigned to the same assignee, a contactless probe system for determining the configuration of an object. It has been found that this prior invention may be utilized with laser shaping apparatus of the present invention.

SUMMARY OF THE INVENTION

Accordingly, it is an object of this invention to provide a new and improved unique laser shaping apparatus.

It is another object of the present invention to provide a new and improved laser shaping apparatus which may automatically be adjusted to maintain the point of shaping of a workpiece coincident with the focal point of the shaping laser light.

It is still another object of the present invention to provide a new and improved laser shaping apparatus wherein an auxiliary monitor light is provided for automatically enabling the necessary adjustments to maintain the point of shaping of a workpiece coincident with the focal point of the shaping laser light.

One other object of this invention is to provide a new and improved unique laser shaping apparatus wherein a monitor light is provided for automatically enabling the necessary adjustments to maintain the point of shaping of a workpiece coincident with the focal point of the shaping laser light and wherein the monitor light is provided from the same source as the laser shaping light.

Briefly, in accordance with this invention, the foregoing and other objects are in one aspect obtained by providing a laser apparatus for automatically shaping a workpiece which includes means for emitting a laser light, a first lens for focusing the emitted laser light onto a point of shaping of the workpiece, a second lens for focusing a monitor light that is passed through the first lens and then projected on and reflected from the workpiece, a vibrating plate having a pinhole for enabling the monitor light focused by the second lens to pass therethrough, vibrating means for vibrating the vibrating plate, a light detector for detecting the light passed through the pinhole, a phase sensitive detector for rectifying the output signal from the light detector in synchronization with a reference signal from the vibrating means, and means for adjusting the distance between the first lens and the workpiece upon receipt of the output signal from the phase sensitive detector.

BRIEF DESCRIPTION OF THE DRAWINGS

A more complete appreciation of the invention will be readily obtained as the same becomes better understood by reference to the following detailed description when considered in connection with the accompanying drawings, wherein:

FIG. 1 is a schematic block diagram of one embodiment of the laser shaping apparatus in accordance with the teachings of the present invention;

FIGS. 2a and 2b are views of one aspect of a shaped workpiece using the laser shaping apparatus of this invention;

DETAILED DESCRIPTION OF THE PREFERRED EMBODIMENTS

Figure 3:
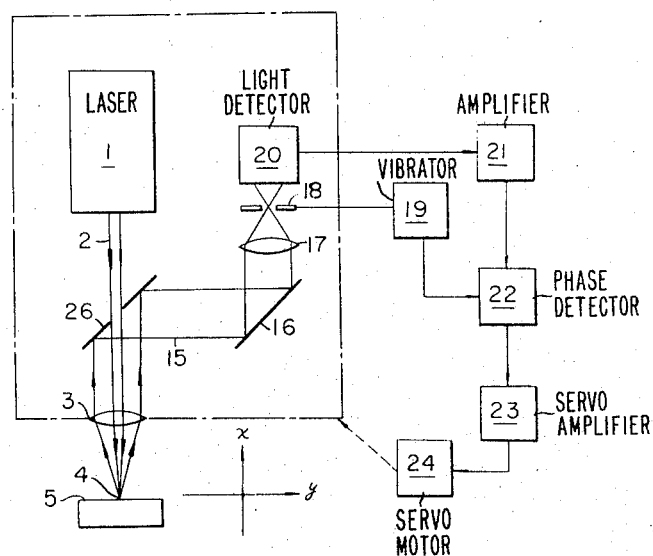
FIG. 3 is a schematic block diagram of an alternative embodiment of the laser shaping apparatus of the invention.

Referring now to the Drawings, wherein like reference numerals designate identical or corresponding parts throughout the several views, and more particularly to FIG. 1 thereof, wherein the dotted-dash line block 100 illustrates a shaping device in accordance with the present invention. Using the orthogonal coordinates x, y, and z as shown, the shaping device 100 is mounted so as to be movable and elevated in the direction of the X-axis. The workpiece 5 that is to be shaped is disposed under the shaping device 100 and is fixed on a table (not shown) in a conventional manner. The table on which the shaping device 100 is fixed may be mounted to move in the directions of the y- and z-axes.

The shaping device 100 includes a laser source 1 and a convex lens 3 fixed therein. The laser source 1 emits a laser light 2 in a downward direction as shown by the arrows, and the flux of light so emitted, as is well known, is highly concentrated. The convex lens 3 is disposed under the shaping device 100 and positioned opposite to the workpiece 5 so that the laser light 2 is focused to form a spot of light 4 on the point of shaping of the surface of the workpiece 5.

The laser source 1 may be any of the well known types, such, for example, a ruby, glass, $CaWO_4$ or YAG laser.

The shaping device 100 also contains an auxiliary source of light 14 therein and the same is fixed within the shaping device 100 so as to emit a parallel beam of light 15 in a downward direction, as shown by the arrows in FIG. 1. The parallel beam of light 15 is used, as explained hereinafter, as a monitor light. Additionally, a semi-transparent mirror 9 is disposed under the source of light 14, while a semi-transparent mirror 10 is disposed under the laser source 1. The mirrors 9 and 10 are fixed within the shaping device 100 so as to be inclined, for example, at an angle of 45° with respect to the x- and y-axes. The monitor light 15 has an angle of incidence of 45 degrees with respect to the mirror 9 and has a reflected component which has an angle of incidence of 45° with respect to the mirror 10. The mirror 10 is disposed within the path of the laser light 2 so that while a part of the light 2 is reflected, transmitted component will be projected on the workpiece 5 through the lens 3. The mirror 10 also while passing a part of the monitor light 15, reflects a component of light 15 through the lens 3 onto workpiece 5. The optical axis of the laser light 2 which is transmitted through the mirror 10 coincides with the monitor input beam of light 15 which is reflected from the mirror 10 such that both light beams coincide with the optical axis of the lens 3. Thus, the lens 3 will impart the same focal point to the laser light 2 and to the monitor light 15. Accordingly, if the workpiece 5 is positioned at the focal point of the convex lens 3, then both the spot 4 of the laser light 2 and the spot of the monitor light 15 will be at a minimum size. On the other hand, if the location of the workpiece 5 is displaced from the focal point, then the spots from the laser light 2 and the monitor light 15 will both become larger.

It should be understood that the monitor light 15 is reflected from the workpiece 5 at the position at which it is projected thereon. The position of the reflected light is particularly important as explained hereinafter. Thus, if the monitor light 15 is reflected at the focal position of the lens 3, then the same will be emitted from the focal point of the lens 3. If, however, the shaping point of the workpiece 5 is displaced from the focal point of the lens 3, then the monitor light reflected will be emitted from the displaced position. The reflected light will pass through the convex lens 3 and after reflection at the mirror 10 will be transmitted through the mirror 9.

A reflecting mirror 16 and a lens 17 are further provided within the shaping device 100. The reflecting mirror 16 is inclined at an angle of 45° with respect to the x- and y-axes and is fixed within the shaping devide 100 so as to reflect the monitor light 15 transmitted through the mirror 9. The focal point of the lens 17 will now be described. FIG. 1 shows the case wherein the monitor light 15 is reflected from the shaping point of the workpiece 5 at the focal point of the lens 3. Thus for such an example, the workpiece 5 is disposed at the focal point of the lens 3. In this case, the reflected light from the workpiece 5 will be converted into a parallel beam of light by the lens 3 and will be incident upon the lens 17. Accordingly, the focal point $Fo$ of this example will coincide or be matched with the focal point of the lens 17. However, if the shaping point of the workpiece is displaced from the focal point of the lens 3, then the image reflected will be focused at a location displaced from the focal point of the lens 17 or be unmatched.

If the point of shaping is, for example, positioned so as to approach, but not be at the focal point of the lens 3, then the monitor light 15 will be reflected at a position in the neighborhood of the focal point of lens 3 rather than at the focal point of the lens 3 such that the reflected monitor light will not become a parallel beam of light after it passes through the lens 3, but instead, will become gradually divergent. In such an example, the focal point of the monitor light will move away from the focal point on the optical axis of the lens 17. Thus, the variation of the focal point of the monitor light 15 of the lens 17 may be utilized so as to monitor the position of the point of shaping.

It should be understood that although the auxiliary source of light 14 may be a conventional lamp, it is preferable to use a laser source, such, for example, as a continuous oscillating laser of the He-Ne gas or the like type. If such a laser is used for the monitor light 15, the same may be made small enough in comparison with the energy of the laser light 2 so as not to interfere therewith and affect the shaping operation. Thus, the energy of the laser light 2 is set large enough to shape the workpiece 5, while the energy of the laser light 15 is set so that shaping of the workpiece will not be effected thereby. By using a small energy of monitor light 15, any error that could be caused by the monitor light acting to shape the workpiece is eliminated. If, for some reason, a hole is formed at a point of shaping on the workpiece by the monitor light 15, the light therefrom is reflected from the bottom of the hole and monitored so as to indicate an error in the monitor light.

The shaping device 100 further includes a vibrating plate 18 and a light detector 20. The vibrating plate 18 is disposed between the lens 17 and the light input portion of the light detector 20, and includes a pinhole 18A on the optical axis of the lens 17. The vibrating plate 18 is supported in such a manner that it may be vibrated in the direction of the optical axis of the lens 17 by a conventional vibrating mechanism 19. The vibrating plate 18 vibrates with a predetermined amplitude and a predetermined frequency in a reciprocating manner about both sides of the pinhole 18A which is coincident with the focal point Fo. Accordingly, the light passed through the pinhole 18A of the vibrating plate 18 becomes modulated by the vibration of the vibrating plate 18. The light detector 20 will convert the light thus modulated into an electric signal representative thereof. The electric signal so generated by the light detector 20 will be an alternating current modulated by the vibration of the vibrating plate 18.

An amplifier 21 is provided exterior to the shaping device 100. The amplifier 21 will amplify the electric signal generated by the light detector 20. A phase sensitive detector 22 is further provided exterior to the shaping device 100. The phase detector 22 receives the output signal Va of the amplifier 21 and a reference signal Vo from the vibrating mechanism 19. The phase detector 22 will synchronously rectify the output signal Va with the reference signal Vo so as to produce a direct current output signal Vd.

If the shaping point of the workpiece 5 is positioned at the focal point of the lens 3, then the vibrating plate 18 will vibrate around the center of the focal point Fo of the lens 17. Accordingly, under such conditions, the output signal Vd of the phase sensitive detector 22 will be zero. However, if the shaping point of the workpiece 5 is displaced from the focal point of the lens 3, then the output signal Vd of the phase sensitive detector 22 will be of a polarity corresponding to the displaced location and direction and will be of an amplitude proportional to the displaced distance. Thus, depending upon the direction that the shaping point is displaced from the focal point of the lens 17, the phase of the light modulated by the vibrating plate 18 will change and accordingly the polarity of the output signal Vd of the phase sensitive detector 22 will differ.

After the output signal Vd of the phase sensitive detector 22 is amplified by a servo amplifier 23, the same is applied to a servo motor 24 which is also connected exteriorly to the shaping device 100. The servo motor 24 serves to drive the shaping device 100 for movement in the direction of the x-axis. The servo motor 24 may be a conventional electric servo, hydraulic servo, or the like. The servo motor 24 drives the shaping device 100 in a direction that will reduce the output signal Vd of the phase sensitive detector 22 to zero. Thus, the shaping device 100 will move so as to position the point of shaping of the workpiece at the focal position of the lens 3.

It should be understood that the servo motor 24 may be so constructed so as to move only the convex lens 3 without the need for moving the entire shaping device 100. Alternatively, the servo motor 24 may be connected to the table upon which the workpiece 5 is disposed so as to move the workpiece 5 in the direction of the x-axis.

The frequency of vibration of the vibrating plate 18 may be by way of example 1KHz. The repetitive frequency of oscillation of the laser source 1 may be varied over a large range, but the same should be small enough in comparison with the frequency of vibration of the vibrating plate 18 such, for example, as between 1 to 15 Hz. Since the frequency of vibration of the vibrating plate 18 is large in comparison with the oscillating frequency of the laser source 1, then the shaping at a point along the workpiece 5 may continue to proceed while the automatic focusing mechanism 200 which includes the vibrating plate 18, the light detector 20, the amplifier 21, the phase sensitive detector 22, the servo amplifier 23, the servo motor 24, and the auxiliary source of light 14 is operated. Thus, the focusing operation will always be completed while the laser source 1 generates pulses for accurately shaping the workpiece at a point of shaping.

If the repetitive frequency of oscillation of the laser source 1 is set at a value larger than that given above, or, if it is used so as to provide a continuous oscillation, then the automatic focusing mechanism 200 must first be operated so as to focus the focal point of the lens at a point of shaping on the workpiece 5 and then allow the laser shaping to occur while the workpiece 5 is held. Thereafter, the workpiece 5 is moved to a new desired shaping position and again stopped when the focal point of the lens is focused thereon. The workpiece 5 is thereby shaped in a repetitive fashion. With such a repetitive procedure with the frequency of oscillation of the laser source 1 being high or of a continuous oscillation, then since it is desirable for the apparatus to shape the workpiece with the focusing being accomplished by the automatic focusing mechanism 200, even if the focusing is not yet completed, the aforesaid shaping procedure will be very effective.

The wavelength of the laser light emitted from the laser source 1, if of the ruby crystal type, may be 0.69 microns and if of the glass, $CaWo_4$, or YAG laser source doped with $Nd^{3+}$ion may be 1.06 microns. On the other hand, the laser light emitted from the auxiliary source of light 14, if of the He-Ne type, may be 0.63 microns. If a ruby laser source is used as the laser source 1 and an He-Ne gas laser source is used as the auxiliary source of light 14, then no problem will occur with regard to color aberration of the convex lens 3. If, however, the glass, $CaWO_4$, or YAG laser source doped with $Nd^{3+}$ion is used as the laser source 1 and an He-Ne gas laser source is used as the auxiliary source of light 14, then it is necessary to use two point achromatic lens of 1.06 and 0.63 microns in wavelength as the convex lens 3.

Referring now to FIGS. 2a and 2b, an example of a shaped workpiece 5 is shown having a very uneven surface 5B. In the past, in order to shape the very uneven surface 5B of the workpiece, it required a very long time to focus a laser beam on the surface thereof. However, with the automatic focusing mechanism 200 of this invention, the shaping time may be greatly shortened. A container 25A is shown in FIG. 2b and a liquid 25 is filled therein so that the workpiece 5 is submerged into the liquid in the container 25A. It should also be understood that with the apparatus of this invention, the object shaping may also be accurately achieved.

Figure 4:
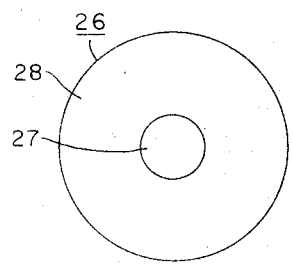
FIG. 4 is an enlarged view of a reflecting mirror utilized in the apparatus of FIG. 3.

In FIGS. 3 and 4, another embodiment of this invention is shown. This embodiment is particularly suitable when a laser of continuous oscillating operation is used as the laser source 1. In this embodiment, the auxiliary source of light 14 and the semi-transparent mirror 9 in the first embodiment shown in FIG. 1 are eliminated and instead of the semi-transparent mirror 10 used in the first embodiment shown in FIG. 1, a reflecting mirror 26 is used. Similar to the semi-transparent mirror 10 of FIG. 1, the reflecting mirror 26 is provided in the path of light of the laser light 2 and is inclined at an angle of 45° with respect to the x- and y-axes within the shaping device 100. However, the reflecting mirror 26 has a hole 27 at the center thereof so as to transmit the laser light 2 therethrough without reflection. FIG. 4 shows a plan view of the reflecting mirror 26. Around the hole 27, an annular reflecting portion 28 is provided.

The laser light 2 from the laser source 1 will pass through the hole 27 of the reflecting mirror 27 and then be focused by the lens 3 for projection onto the workpiece 5. In the example shown in FIG. 3, the optical axis of the laser light 2 coincides with that of the lens 3. The laser light 2 projected on the workpiece 5 is reflected from the workpiece 5 and again passes through the lens 3 where it is reflected from the reflecting portion 28 of the reflecting mirror 26. The light reflected from the mirror 26 is then reflected at the reflecting mirror 16 and thereafter focused by the lens 17. The light reflected at the workpiece 5 and then passed through the lens 17 may be used as a monitor light 15 so that it varies the focusing point of the lens 17 in response to the position of the workpiece 5. The automatic focusing mechanism 200 is constructed similar to that shown in FIG. 1 so that the servo motor 24 will operate in response to any variation of the focusing point of the image on the surface of the lens 17.

Figure 5:
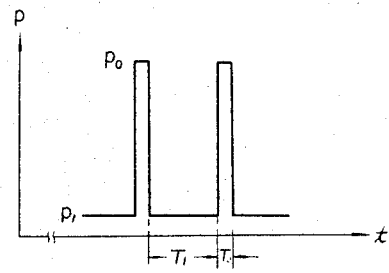
FIG. 5 is a graph showing the amplitude of energy of laser light of the laser shaping apparatus of FIG. 3; and, FIG. 6 is a schematic block diagram of still another alternative embodiment of the laser shaping apparatus of the present invention.

FIG. 5 shows the variations of the energy of the laser light 2 of the laser source 1 shown in FIG. 3, wherein the ordinate of the graph indicates the energy P of the laser light 2 and the abscissa thereof indicates the time $t$. Reference character $Po$ depicts the energy at the time that the shaping of a workpiece is actually performed, while $P_1$ indicates the energy during the time that the focusing is achieved. Here, $Po$ is set at an amplitude large enough to shape the workpiece 5, while $P_1$ is set at the amplitude which is unable to shape the workpiece 5. Accordingly, the relationship $Po>P_1$ exists. The value of $P_1$ is sufficiently small to be effective in avoiding error of focusing similar to the case wherein a laser source having a small energy is used as the auxiliary source of light 14. In FIG. 5, To indicates the actual period of time of shaping, while $T_1$ indicates the period of time of focusing. The energy of the laser light 2 may be varied by controlling the excitation state of the laser source 1.

It is preferable to use a continuous oscillating laser as the laser source in the embodiments shown in FIGS. 3 and 4, because the laser light 2 is utilized as the monitor light. Various laser sources may be used as the continuous oscillating laser, such, for example, as a ruby laser source, a glass, $CaWO_4$, or YAG laser, or an He-Ne gas laser source. Additionally, an infrared continuous oscillating laser, such as a $CO_2$ gas laser, may be used. Since the lens 3 passes light of the same wavelength for both the shaping and the monitoring laser, no problem will occur with color aberration.

The embodiment shown in FIGS. 3 and 4 does not require any auxiliary source of light for monitoring as is the case with the embodiment of FIG. 1. The embodiment of FIGS. 3 and 4 is therefore simpler to the extent that the auxiliary source of light is eliminated.

Figure 6:
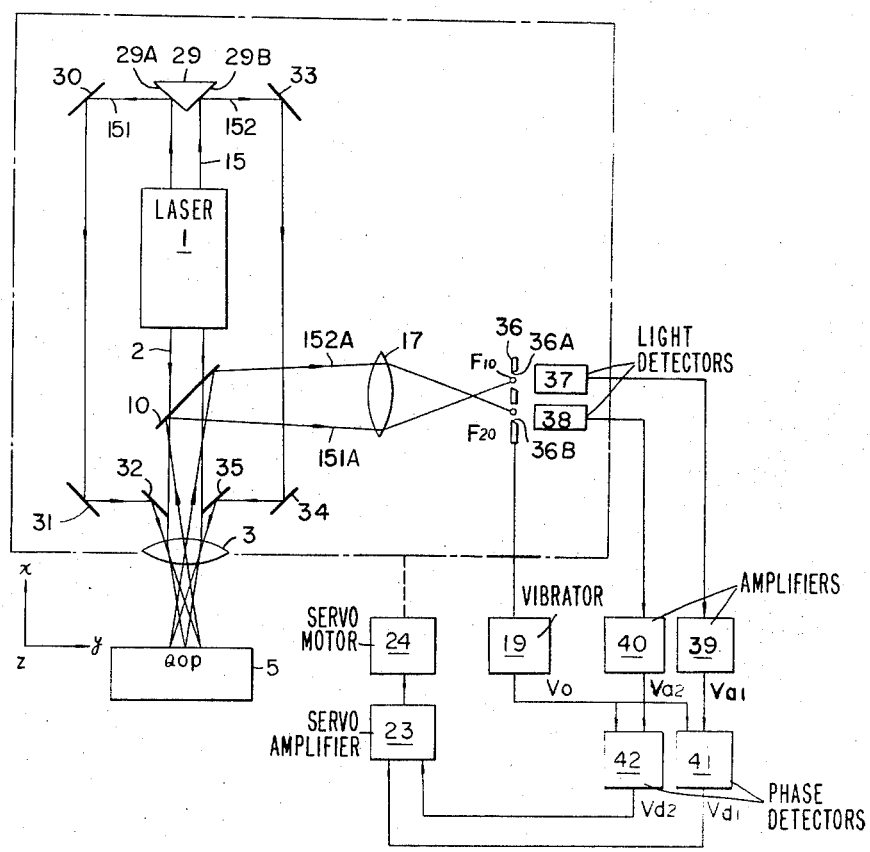

FIG. 6 shows still another embodiment of the apparatus of the invention. With this embodiment, a continuous oscillating laser may be used and a continuous shaping operation realized. This differs from the embodiment shown in FIGS. 3 and 4, wherein the period To is used to shape and that of $T_1$ to monitor as shown in FIG. 5. Thus, in the embodiment of FIGS. 3 and 4, the actual shaping of a workpiece is intermittently accomplished, while in the embodiment shown in FIG. 6, the shaping of a workpiece may proceed continuously.

In the embodiment shown in FIG. 6, the laser source 1 emits the laser light simultaneously in both the upward and downward directions. The laser light 2 emitted in the downward direction is used for shaping the workpiece, while the laser light 15 emitted in the upward direction is used for the monitor light. In the embodiment, the semi-transparent mirror 10, shown in FIG. 1, is again used in the path of the laser light 2 so that after the laser light 2 passes through the mirror 10, it is projected onto the workpiece 5 after being focused by the lens 3.

In order to introduce the monitor light 15 onto the shaping surface of the workpiece 5, a prism 29 and reflecting mirrors 30, 31, 32, 33, 34, and 35 are provided. The monitor light 15 is divided into a first monitor light 151 and a second monitor light 152 by the respective reflecting surfaces 29A and 29B of the prism 29. After the first monitor light 151 is, in turn, reflected by the reflecting mirrors 30, 31 and 32, it is passed through the lens 3 for projection onto the workpiece 5. After the second monitor light 152 is, in turn, reflected by the reflecting mirrors 33, 34, and 35, it is passed through the lens 3 for projection onto the workpiece 5. Assume that the focal point of the lens 3 of the laser light 2 is designated by the point O as shown on the workpiece 5 in the drawing, the focal point of the lens 3 of the first monitor light 151 by P, and the focal point of the lens 3 of the second monitor light 152 by Q. The points P and Q are symmetrically located with respect to the point O and are spaced equally and a small distance from the point O. The points P and Q are set so that they are disposed in a plane perpendicular to the optical axis of the lens 3 and which includes the point O. The reflecting mirrors 30, 31, 32, 33, 34, and 35 are fixed within the shaping device 100 and are adjusted in angle so that the first and second monitor lights 151 and 152 are focused at the points P and Q.

The monitor lights 151 and 152 which are projected onto the workpiece 5 are reflected at the surface of the workpiece 5. Assume that the reflected light of the monitor light 151 is designated by reference numeral 151A and that of the monitor light 152 is designated by 152A. After the light beams 151A and 152A pass through the lens 3, they are reflected by the mirror 10 and focused by the lens 17. The focal points of the light beams 151A and 152A of the lens 17 will move in the direction of the optical axis of the lens 17 in response to the projecting point on the workpiece 5 of the light beams 151 and 152. If the monitor light 151 is projected on the workpiece at the point P (shown in the drawing), the focal point of the light 151A will be $F_{10}$ and if the monitor light 152 is projected on the workpiece at the point Q (as shown in the drawing), then the focal point of the light 152A will be $F_{20}$. The points $F_{10}$ and $F_{20}$ are in a vertical plane with respect to the optical axis of the lens 17 so that a vibrating plate 36 is provided that vibrates in the direction of the optical axis of the lens 17 around the plane as a center. Pinholes 36A and 36B are provided within the vibrating plate 36 at positions corresponding to the focal points $F_{10}$ and $F_{20}$. The vibrating plate 36 is vibrated by the vibrating mechanism 19. If the projecting point of the monitor light beams 151 and 152 on the workpiece 5 are displaced so as to approach the lens 3 from the points P and Q, the focal points of the light 151A and 152A, will be displaced from the points $F_{10}$ and $F_{20}$ so as to move away from the lens 17. If the projecting point of the monitor light beams on the workpiece 5 are so displaced from the points P and Q so as to move away from the lens 3, then the focal points of the lights 151A and 152A will be displaced from the points $F_{10}$ and $F_{20}$ so as to approach the lens 17. The light passed through the pinholes 36A and 36B will be modulated by the frequency of vibration of the vibrating plate 36 and then introduced into the light detectors 37 and 38 for conversion into an electric signal. Reference numerals 39 and 40 designate amplifiers for amplifying the electric signals at the output of the respective light detectors 37 and 38, and 41 and 42 designate phase sensitive detectors. The phase sensitive detector 41 receives the output signal $Va1$ from the amplifier 39 and a reference signal $Vo$ from the vibrating mechanism 19 for rectifying the signal $Va1$ in synchronization with the signal $Vo$ to thereby generate a direct current output signal $Vd1$. The phase sensitive detector 42 receives the output signal $Va2$ from the amplifier 40 and a reference signal $Vo$ from the vibrating mechanism 19 for rectifying the signal $Va2$ in synchronization with the signal $Vo$ to thereby generate a direct current output signal $Vd2$. The signals $Vd1$ and $Vd2$ have a polarity dependent upon the direction of displacement and amplitudes proportional to the displaced distances in accordance with the respective displacements of the reflected positions of the monitor light beams 151 and 152 with respect to the points P and Q. The signals $Vd1$ and $Vd2$ are added together and then applied to the servo amplifier 23 so that the servo motor 24 may be used to adjust the distance between the lens 3 and the workpiece 5 until a value of zero for the sum of the signals $Vd1$ and $Vd2$ results.

If the projecting points of the monitoring light beams 151 and 152 on the workpiece 5 coincide with the points P and Q, then the signals $Vd1$ and $Vd2$ when added together will equal zero so that the servo motor 24 will not be operated with the result that the distance between the lens 3 and the workpiece 5 is maintained as it is. The points P and Q are included in the plane which includes the point O, and are spaced an extremely small distance from the point O so that if the projecting points of the incident light beams 151 and 152 upon the workpiece 5 coincide with the points P and Q, then the point O may be considered as being located just at the shaping point.

If the projecting points of the monitor beams 151 and 152 upon the workpiece 5 are displaced from the points P and Q, then the servo motor 24 will operate to correct the displacement. Assume that the projecting point of the monitor light 151 on the workpiece 5 is, for example, displaced from the point P so as to approach the lens 3 at a predetermined distance, while the projecting point of the monitor light 152 on the workpiece 5 is displaced from the point Q so as to move away from the lens 3 at the same predetermined distance. Under such conditions, the signals $Vd1$ and $Vd2$ will have the same amplitude as each other and be opposite in polarity. As such, the sum of these signals will be zero and the distance between the lens 3 and the workpiece 5 will be kept as it is. As clearly seen from this example, the projecting point of the laser light 2 upon the workpiece 5 is considered to be located intermediate the projecting point of the incident light 151 and the projecting point of the incident light 152 on the workpiece 5 so as to allow for adjustment of the distance between the workpiece 5 and the lens 3.

It should be understood that in the embodiment shown in FIG. 6, the laser light 15 which is emitted simultaneously with the laser light 2 and in an opposite direction is utilized as a monitor light. It is generally true that even if the laser source is designed so as to emit light in only one direction, that laser light will usually leak in the opposite direction thereof. Thus, even if designed so that the laser light 2 will be emitted only downwardly from the laser source 1, it is difficult, if not impossible, to eliminate an upwardly directed laser. The laser light 15 has a much smaller energy than that of the laser light 2, yet the same is large enough for utilization as a monitor light in this embodiment. The requirement for providing an auxiliary source of light for monitoring is eliminated and the apparatus thereby simplified. The monitor light 15 is preferably of an energy insufficient for shaping the workpiece 5. As a result, a workpiece may be continuouslly shaped by projecting the laser light 2 as the workpiece 5 is moved in the direction of the y-and z-axes, since the monitor light will continuously allow proper focusing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A laser shaping apparatus comprising:
   laser means for emitting a laser beam,
   a first lens for focusing the laser beam from said laser means onto the shaping surface of a workpiece as a shaping laser beam,
   means for projecting a monitor light beam through said first lens onto said shaping surface from which it is reflected
   a second lens for focusing said reflected monitor light beam,
   a vibrating plate with a pinhole therein for passing the monitor light beam focused by said second lens,
   a vibrating means for vibrating said vibrating plate,
   a light detector for receiving the light passed through the pinhole of said vibrating plate,
   a phase sensitive detector for rectifying an output signal from said light detector in sychronization with a reference signal from said vibrating means, and means for adjusting the distance between said first lens and the workpiece upon receipt of an output signal from said phase sensitive detector, wherein said laser means emits laser beams in two opposite directions and wherein the laser beam in one direction is used as said shaping laser beam, while the laser beam in the opposite direction is used as said monitor light beam.

2. A laser shaping apparatus comprising:

laser means for emitting a laser beam, means for providing a monitor light beam, a first lens for simultaneously focusing the shaping laser beam from said laser means and said monitor light beam, a workpiece disposed so as to receive the shaping laser beam and the monitor light beam focused by said first lens, a second lens for focusing a portion of said monitor light beam reflected from said workpiece, a vibrating plate with a pinhole therein for passing the monitor light beam focused by said second lens, vibrating means for vibrating said vibrating plate, a light detector for receiving the light passed through the pinhole of said vibrating plate, and for providing an output signal indicative thereof, a phase sensitive detector for rectifying said output signal from said light detector and, means for adjusting the distance between said first lens and the workpiece upon receipt of an output signal from said phase sensitive detector, wherein the focal point of the shaping laser beam through said first lens and that of the monitor light beam are positioned in a common plane perpendicular to the optical axis of said first lens and simultaneously spaced a small distance from each other.

3. A laser processing apparatus as set forth in claim 2, wherein said laser means emits laser beams in two opposite directions, the laser beam in one direction being used as said shaping laser beam while the laser beam in the opposite direction is used as said monitor light beam.

4. A laser shaping apparatus as set forth in claim 3, wherein the energy of the laser beam used as a monitor light beam is of insufficient amplitude to shape by melting said workpiece.

5. A laser shaping apparatus comprising:

a laser means for emitting a laser beam, means for providing first and second monitor light beams, a first lens for focusing the laser beam of said laser means and said first and second monitor light beams, a workpiece disposed so as to receive said laser beam and reflect portions of said first and second monitor light beams focused by said first lens, a second lens for focusing said reflected portions of said first and second monitor light beams, a vibrating plate with a first pinhole therein for passing the first monitor light beam focused by said second lens and with a second pinhole therein for passing the second monitor light beam focused by said second lens, vibrating means for vibrating said vibrating plate, two light detectors for receiving the light passed respectively through said first and second pinholes, two phase sensitive detectors for rectifying output signals from said two light detectors in synchronization with a reference signal from said vibrating means, and, means for adjusting the distance between the said first lens and said workpiece in response to a signal representing the sum of the respective output signals from said two phase sensitive detectors.

6. A laser shaping apparatus as set forth in claim 5, wherein the focal point of the laser beam passing through said first lens and of the first and second monitor light beams are in a common place perpendicular with respect to the optical axis of said first lens and wherein the focal point of the first monitor light beam and that of the second monitor light beam are disposed symmetrically in relationship to the focal point of the laser beam and are equally spaced a small distance apart.

7. A laser shaping apparatus as set forth in claim 6, wherein said laser means emits laser beams in two opposite directions and wherein the laser beam in one direction is used as said shaping laser and wherein the laser beam in the opposite direction is further divided into two beams, one of which is used as said first monitor light beam and the other of which is used as said second monitor light beam.

8. A laser shaping apparatus as set forth in claim 7, wherein the energy of the laser beams used as first and second monitor light beams are set to levels insufficient in amplitude to shape said workpiece by melting.

* * * * *